United States Patent
Russell, Sr.

(10) Patent No.: US 7,721,681 B1
(45) Date of Patent: May 25, 2010

(54) HYDROCARBON AND WATER HYBRID ENGINE

(76) Inventor: Charles William Russell, Sr., 928 Muirfield Rd., Los Angeles, CA (US) 90019

( * ) Notice: Subject to any disclaimer, the term of this patent is extended or adjusted under 35 U.S.C. 154(b) by 126 days.

(21) Appl. No.: 11/973,176

(22) Filed: Oct. 6, 2007

Related U.S. Application Data

(60) Provisional application No. 60/850,588, filed on Oct. 6, 2006, provisional application No. 60/850,589, filed on Oct. 6, 2006, provisional application No. 60/850,514, filed on Oct. 10, 2006, provisional application No. 60/850,607, filed on Oct. 10, 2006, provisional application No. 60/850,608, filed on Oct. 10, 2006.

(51) Int. Cl.
*F02B 43/08* (2006.01)

(52) U.S. Cl. ............ 123/1 A; 123/3; 123/DIG. 12

(58) Field of Classification Search ........ 123/1 A, 123/3, DIG. 12; 429/17, 19; 422/198
See application file for complete search history.

(56) References Cited

U.S. PATENT DOCUMENTS

| | | | |
|---|---|---|---|
| 3,664,134 A | 5/1972 | Seitz | |
| 3,918,412 A | 11/1975 | Lindstrom | |
| 4,037,568 A * | 7/1977 | Schreiber | 123/3 |
| 4,107,282 A * | 8/1978 | Christopher | 423/657 |
| 5,910,097 A | 6/1999 | Boegner | |
| 6,348,278 B1 | 2/2002 | LaPierre | |
| 6,502,533 B1 | 1/2003 | Meacham | |
| 6,620,537 B2 | 9/2003 | Struthers | |
| 7,087,331 B2 | 8/2006 | Keefer | |
| 2003/0008183 A1 | 1/2003 | Hsu | |
| 2003/0129100 A1 | 7/2003 | Ukai | |
| 2004/0197612 A1 | 10/2004 | Keefer | |
| 2006/0207176 A1 | 9/2006 | Oroskar | |

* cited by examiner

*Primary Examiner*—M. McMahon
(74) *Attorney, Agent, or Firm*—Dennis W. Beech

(57) ABSTRACT

The present invention involves methods and apparatus for supplying fuel for a hydrocarbon and water hybrid engine. Water may be supplied from a water supply source to a steam chamber disposed with an exhaust conduit. Heat may be conducted from the exhaust conduit to the steam chamber to produce steam. The steam may be flowed to a catalytic converter that may have a substrate element disposed therein with the substrate element coated with an oxide that may be oxidizable with steam and reducible back to the original state without use of a chemical agent while producing oxygen. The steam may be converted to hydrogen and oxygen and the hydrogen and oxygen may be flowed to an intake port of the internal combustion engine. The steam and catalytic converted hydrogen and oxygen may be used as an energy source and the hydrogen and oxygen may be converted to heated water for recycling as a steam source.

3 Claims, 1 Drawing Sheet

US 7,721,681 B1

HYDROCARBON AND WATER HYBRID ENGINE

This application claims the benefit of U.S. Provisional Application Nos. 60/850,588 and 60/850,589 filed on Oct. 6, 2006, and of 60/850,514, 60/850,607 and 60/850,608 filed on Oct. 10, 2006.

BACKGROUND OF THE INVENTION

This invention relates to internal combustion engines that burn hydrocarbons such as gasoline and may be used to power land vehicles or for other purposes. The new hybrid engine may operate on a fuel of gasoline and water wherein the water may be converted to steam to create hydrogen and oxygen in a catalytic converter. The method of hydrogen and oxygen production may be used as an energy source.

Various systems and methods using steam reformation processes with hydrocarbons and catalysts may be known. These processes may be principally known for use in generating hydrogen for use in fuel cells. Reform reactors for use with Otto cycle internal combustion engines that may be powered by gasoline may be known. This type of combustion engine use hydrocarbon fuel at elevated temperatures to pass through a reforming reactor prior to delivery to the engine combustion chamber. In the presence of a reforming catalyst and water a part of the fuel may be converted to carbon monoxide and hydrogen by reaction with steam. A portion of the flow of exhaust gas from the combustion engine may be delivered to the reforming reactor and mixed with the fuel delivered to the reforming reactor.

SUMMARY OF THE INVENTION

The present invention is directed to methods and apparatus for supplying fuel for a hydrocarbon and water hybrid engine. Water may be supplied from a water supply source to a steam chamber disposed with an exhaust conduit. Heat may be conducted from the exhaust conduit to the steam chamber to produce steam. The steam may be flowed to a catalytic converter that may have a substrate element disposed therein with the substrate element coated with an oxide that may be oxidizable with steam and reducible back to the original state without use of a chemical agent while producing oxygen. The steam may be converted to hydrogen and oxygen and the hydrogen and oxygen may be flowed to an intake port of the internal combustion engine. The steam and catalytic converted hydrogen and oxygen may be used as an energy source and the hydrogen and oxygen may be converted to heated water for recycling as a steam source.

These and other features, aspects and advantages of the present invention will become better understood with reference to the following drawings, description and claims.

DETAILED DESCRIPTION

Figure 1:
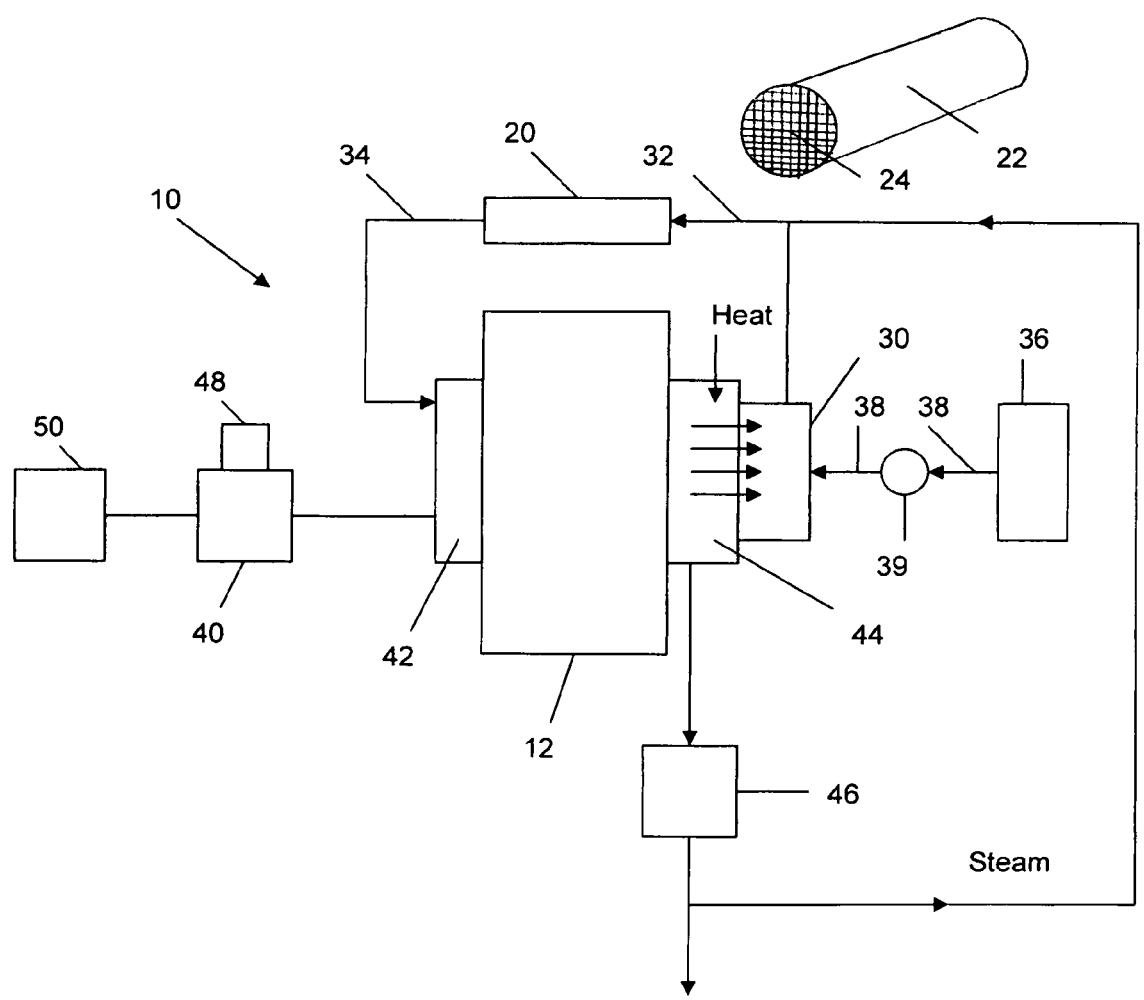
FIG. 1 illustrates a schematic representation of a hybrid engine according to an embodiment of the invention.

The following detailed description represents the best currently contemplated modes for carrying out the invention. The description is not to be taken in a limiting sense, but is made merely for the purpose of illustrating the general principles of the invention.

Referring to FIG. 1, a hybrid engine 10 that may operate on a combination of fuel such as gasoline and hydrogen plus oxygen may have a catalytic converter 20 that may use a catalyst such as bismuth trioxide, Bi2O3. The catalyst may be retained on a substrate element 22 that may be inserted in the catalytic converter 20 body that may be of hollow cylindrical form. The substrate element 22 may be of cylindrical form with a honeycomb like interior structure of cells 24 that for a typical small engine may be approximately 1000 passages to provide approximately 270 square inches of surface.

The substrate element 22 may be prepared in the case of use of bismuth trioxide by first dissolving a bismuth material or compound in acid. A suitable substrate for absorption of the bismuth molecule may then be immersed in the acid and bismuth mixture to absorb the bismuth. The substrate element 22 may then be removed, dried and then heated to oxidize the bismuth to a trioxide form. Bismuth trioxide has been found to be a stable form of bismuth oxide.

For bismuth trioxide Bi2O3 when heat may be applied in the presence of air, a higher oxidation state may be reached, such as Bi2O4 or Bi2O5. These oxides tend to reduce back to Bi2O3 when cooled and release oxygen. Experiments with catalytic conversion have proven that water in the form of steam may oxidize Bi2O3 to produce hydrogen gas and when cooled, oxygen gas. If the steam and Bi2O3 may be heated to the proper temperature, for example, a temperature range from approximately 200 degrees F. to 1,200 degrees F., both hydrogen and oxygen gases may be produced in a form that can be ignited. A continuous stream of steam may produce a continuous gas mixture of ignitable hydrogen and oxygen.

Bismuth trioxide may not be the only oxide compound that converts the water molecule of steam. Various oxides of certain elements may oxidize with steam to produce hydrogen gas. The system and method of this invention may use oxides of elements that may be oxidized with steam and reduce back without a chemical reducing agent while producing oxygen gas. Examples of such oxides may be selenium, tellurium, arsenic, manganese, and antimony. While the detailed description of an internal combustion engine 10 may be described using bismuth trioxide, other oxides with similar chemical properties may also be used.

A hybrid engine 10 may have an internal combustion engine 12 that may be structured to use a combination of gasoline, hydrogen and oxygen as fuel. For combustion, the gasoline may be vaporized with air, for example, in a carbonator 40 in fluid communication with an intake manifold 42 of the engine 12. The hydrogen and oxygen may be produced in the catalytic converter 20 by passing steam therethrough and channeling the hydrogen and oxygen gases to the intake manifold 42. The steam may be produced by using the heat of the engine 12 to convert water to steam. A steam chamber 30 may be disposed with an exhaust manifold 44 to allow heat from the engine 12 exhaust gases to conduct through the walls of the exhaust manifold 44 and the steam chamber 30 to heat a water flow. The steam may flow through conduit 32 to converter 20 and the hydrogen and oxygen gases produced may flow through conduit 34 to the intake manifold 42.

A hybrid engine 10 with engine 12 may have an exhaust system with a muffler 46. The carburetor may have an air intake 48 with an air filter. A gasoline fuel tank 50 may be connected to the carburetor 40 and may be controlled by a throttle or valve. A water tank 36 may be in fluid communication with the steam chamber 30 by a conduit 38 and water flow may be controlled by a valve 39, throttle or the like.

The ratio of water to gasoline used may depend on the throttling of each fuel system. If a greater ratio of water may be used, it may be converted to steam from a heat source of the engine 12, passed over the bismuth trioxide, and then metered into the intake system. As more power may be produced by use of water, the gasoline fuel may be reduced or throttled back. This may result in a hybrid engine 10 that operates primarily with water as a fuel. The engine may be started using gasoline and then converting to use of water. If there is sufficient secondary or wasted heat available, the engine 12 may convert solely to water as a fuel source.

The exhaust from a gasoline powered engine may produce several different gases or vapors and steam may be one of these. Experiments have shown that the steam portion of exhaust gases may be converted in a catalytic converter 20 to hydrogen and oxygen gases by passing the exhaust gases over bismuth trioxide. When an engine may be fueled with hydrogen and oxygen as a fuel source the engine may expel water in the form of steam. The steam produced may be passed over the bismuth trioxide to produce hydrogen and oxygen as a usable fuel thereby recycling the water. When steam may be produced by metering water to a heat source and passing over bismuth trioxide, the hydrogen and oxygen produced may pass directly to a port in the intake manifold of an engine without the presence of environmental air. When an engine may run on water as a fuel source, there may not be any carbon or nitrogen products expelled into the atmosphere.

While the invention has been particularly shown and described with respect to the illustrated embodiments thereof, it will be understood by those skilled in the art that the foregoing and other changes in form and details may be made therein without departing from the spirit and scope of the invention.

I claim:

1. A method for supplying fuel for a hydrocarbon and water hybrid engine comprising:
    supplying water from a water supply source to a steam chamber disposed adjacent to an exhaust conduit of an internal combustion engine;
    conducting heat from said exhaust conduit to said steam chamber to produce steam;
    flowing said steam to a catalytic converter that has a substrate element disposed therein with said substrate element coated with an oxide that is oxidizable with steam; and
    converting said steam to hydrogen and oxygen and flowing said hydrogen and oxygen to an intake port of said internal combustion engine, and converting hydrogen and oxygen to steam in the combustion process, and recycling the steam to the catalytic converter.

2. The method as in claim 1 wherein said oxide is selected from the group consisting of bismuth, selenium, tellurium, arsenic, manganese, and antimony.

3. The method as in claim 1 wherein the steam temperature is approximately between 200 degrees F. to 1,200 degrees F.

* * * * *